United States Patent
Lee et al.

(10) Patent No.: US 8,265,280 B2
(45) Date of Patent: Sep. 11, 2012

(54) SYSTEM AND METHOD OF ENTANGLED PHOTONS GENERATION

(75) Inventors: Kim Lee, Houghton, MI (US); Gregory S. Kanter, Chicago, IL (US)

(73) Assignee: Nucrypt LLC, Evanston, IL (US)

( * ) Notice: Subject to any disclaimer, the term of this patent is extended or adjusted under 35 U.S.C. 154(b) by 878 days.

(21) Appl. No.: 12/372,213

(22) Filed: Feb. 17, 2009

(65) Prior Publication Data
US 2009/0268276 A1 Oct. 29, 2009

Related U.S. Application Data (63) Continuation-in-part of application No. 11/404,329, filed on Apr. 13, 2006, now Pat. No. 7,697,687, and a continuation-in-part of application No. 10/982,196, filed on Nov. 5, 2004, now abandoned.

(60) Provisional application No. 61/028,771, filed on Feb. 14, 2008.

(51) Int. Cl.
G02F 1/39 (2006.01)
(52) U.S. Cl. ........ 380/263; 380/256; 380/260; 380/278; 713/160
(58) Field of Classification Search .................... 380/263
See application file for complete search history.

(56) References Cited

U.S. PATENT DOCUMENTS

| | | | |
|---|---|---|---|
| 5,416,588 A * | 5/1995 | Ducharme et al. ............. 356/369 |
| 5,768,378 A * | 6/1998 | Townsend et al. ............. 380/256 |
| 5,805,705 A * | 9/1998 | Gray et al. ..................... 713/160 |
| 6,137,925 A * | 10/2000 | Stimple et al. ................... 385/11 |
| 6,424,665 B1 * | 7/2002 | Kwiat et al. ....................... 372/21 |
| 6,897,434 B1 * | 5/2005 | Kumar et al. ............. 250/227.18 |
| 7,333,611 B1 * | 2/2008 | Yuen et al. ..................... 380/256 |
| 7,639,953 B2 * | 12/2009 | Spillane et al. ............... 398/176 |
| 7,831,050 B2 * | 11/2010 | Barbosa ......................... 380/278 |
| 2005/0152540 A1 * | 7/2005 | Barbosa .......................... 380/28 |
| 2008/0007813 A1 * | 1/2008 | Wang et al. ..................... 359/245 |
| 2008/0101607 A1 * | 5/2008 | Liang et al. .................... 380/260 |
| 2009/0135870 A1 * | 5/2009 | Hayat et al. ................. 372/44.01 |

OTHER PUBLICATIONS

"Ultra stable all-fiber telecom-band entangled photon-pair source for turnkey quantum communication applications" by Liang et al, Jul. 24, 2006.*

* cited by examiner

*Primary Examiner* — Kambiz Zand
*Assistant Examiner* — Yonas Bayou
(74) *Attorney, Agent, or Firm* — Nadya Reingand (57) ABSTRACT

The present invention provides an apparatus and method for producing entangled photon pairs via four-wave mixing in optical fiber. The source of entangled photons is designed to be stable with no manual alignment. This is accomplished with proper system design using polarization maintaining fibers or polarization controllers with feedback control. The source may contain a method of switching the output from an unpolarized entangled state to a polarized state, where the polarized state can be used to more easily align subsequent photon measurement systems to the proper configuration for measuring the unpolarized entangled state. The invention further provides a means to engineer the apparatus, including the use of a periodic filter common to both entangled pairs, such that the wavelength spacing between the pairs can be optimized such that multiple pairs can be generated with reduced adverse influence from Raman scattering.

20 Claims, 9 Drawing Sheets

SYSTEM AND METHOD OF ENTANGLED PHOTONS GENERATION

CROSS-REFERENCE TO RELATED APPLICATIONS

The present invention claims the benefit of U.S. Ser. No. 61/028,771 filed Feb. 14, 2008 and is also a continuation-in-part of U.S. Ser. No. 11/404,329 filed Apr. 13, 2006 now U.S. Pat. No. 7,697,687 and U.S. Ser. No. 10/982,196 filed Nov. 5, 2004, now abandoned all of which are fully incorporated herein by reference.

STATEMENT REGARDING FEDERALLY SPONSORED RESEARCH OR DEVELOPMENT

The United States Government has certain rights to this invention pursuant to contract no. W911NF-07-C-0075 from the US Army Research Office.

FIELD OF THE INVENTION

The present invention relates to a method of generating quantum states of light called entangled photons. These states have various applications including quantum communication and quantum computing.

BACKGROUND

Entangled photon states are special quantum states of light which have been shown to be useful for various applications such as quantum key distribution and metrology. This invention is related to the creation of entangled photon states in a practical manner. Entangled light can be generated using various nonlinear processes including those in nonlinear crystals, such as described in U.S. Pat. No. 6,424,665 by P. G. Kwiat et al, as well as using the third order nonlinearity in fiber as described in U.S. Pat. No. 6,897,434 by Kumar et al. The entangled light is typically produced in two wavebands called the signal and idler bands, where the unique properties of entanglement only become apparent when measuring both wavebands simultaneously. The use of fiber is beneficial because it is often desired to send the entangled photons over long distances using low-loss optical fiber. By generating the entangled photons directly in fiber one can avoid coupling losses. Other benefits, such as very high spatial mode purity, are also realized.

Some schemes for realizing entanglement using the nonlinearity of fiber have been specified in U.S. Pat. No. 6,897, 434 by Kumar et al. Later work was published as "Ultra Stable All-Fiber Telecom-Band Entangled Photon-Pair Source for Turnkey Quantum Communication Applications," in Optics Express, 14, 6936, 2006 by Liang et al. which used a more advanced design in order to make the system more robust and easier to use. This so called "self-aligned" fiber-based entanglement source put the nonlinear fiber inside a Michelson interferometer with Faraday mirrors in order to make it insensitive to polarization fluctuations. Normally, interferometers need feedback control in order to stabilize phase and polarization fluctuations in the interferometer. This can be mitigated by using a Sagnac loop interferometer such that only a single polarization control element is needed to account for birefringence in the loop. A Sagnac loop is robust as it only needs a single polarization adjustment, but due to slow changes in the fiber birefringence it needs periodic re-alignment. The "self-aligned" scheme however, is supposed to be "alignment free" as it does not need any internal polarization control elements. Instead, the action of the Faraday mirror makes the system inherently stable.

Figure 1:
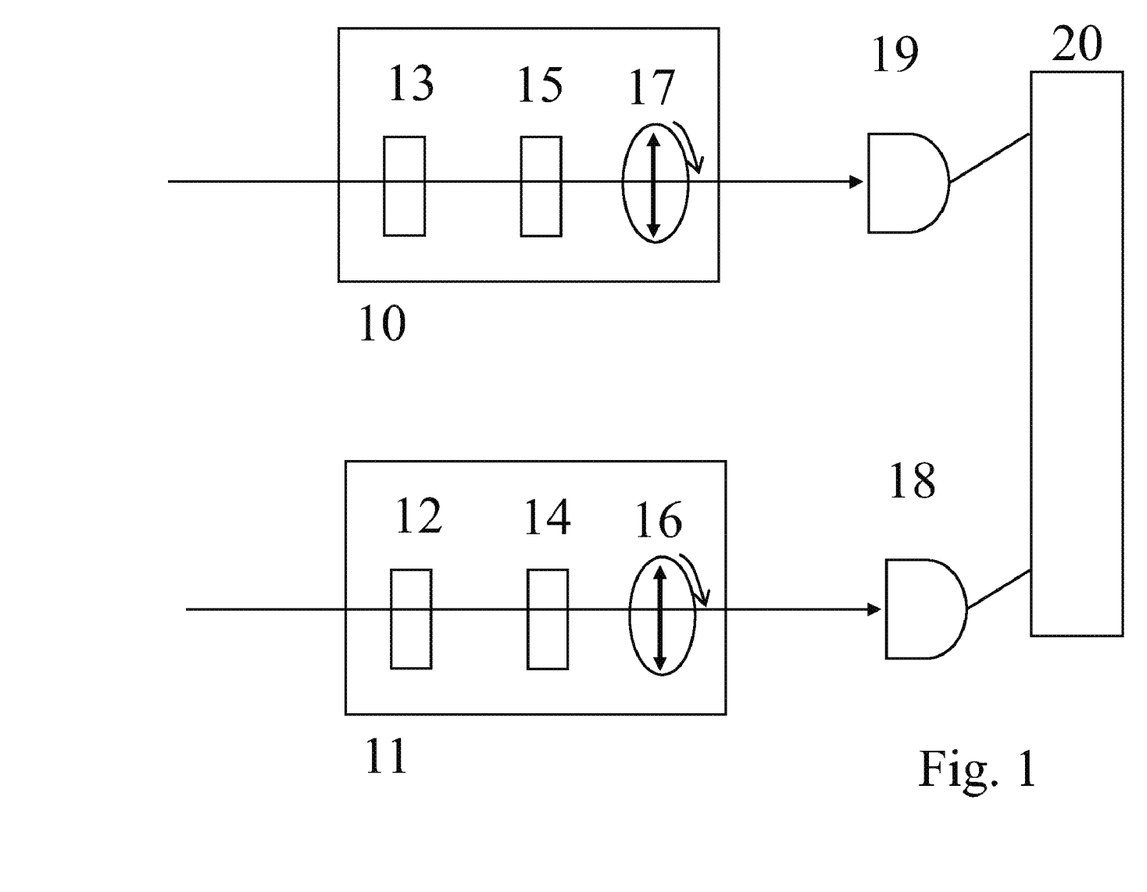
FIG. 1 (Prior art) shows one embodiment of the polarization analyzer followed by a single photon detector. The polarization analyzer consists of elements that rotate the input polarization followed by a polarizing element.

Although this new design represents advancement in creating a robust entanglement source, it still has a number of drawbacks particularly as pertains to the complexity of the initial alignment of the source and subsequent detection apparatus. It is desirable to engineer an entangled photon source which is simple to align and for which the alignment of the source and the subsequent detection apparatus could be easily automated. The detection apparatus is a polarization analyzer, of which one implementation is shown in FIG. 1. The signal is input to one polarization analyzer 10 and the idler to another 11. They each contain a series of waveplates, in this case a half wave plate 12,13 and a quarter waveplate 14,15 although other types of polarization analyzers can use other components such as variable waveplates and have more or fewer components. In FIG. 1 each analyzer has a rotatable polarizer 16,17. The photons are detected with single photon detectors 18,19 after exiting the analyzer at which point the output from each detector is counted and correlated in a processor 20. It is the nature of entangled sources that interference can occur in the correlations of the detectors as a function of the angle of the rotatable polarizer, even though the statistics of the singles counts is not polarization dependent.

Since entangled light is effectively unpolarized, the photon counts from a particular detector are not a function of the setting of the polarization analyzer. However, the analyzer must be set properly in order to make a desired measurement. The settings may be relatively easy to determine when using an apparatus that generates entanglement in free-space. In such a case, as in U.S. Pat. No. 6,424,665 by P. G. Kwiat et al., the two orthogonal polarizations which are the constituent components of the entangled light exit the source, typically at polarizations called H and V, which can be referenced to the physical axis of the laboratory and correspond to horizontal and vertical polarizations. For this reason the polarization analyzer used in U.S. Pat. No. 6,424,665 is a simple half-wave plate followed by a polarizer which is equivalent to a rotatable polarizer. The H and V axis are clearly defined in physical space. There is a relative phase term between the H and V axis that must be set, producing an entangled state of $|H\rangle|H\rangle + e^{i\phi}|V\rangle|V\rangle$, but that phase can be set, for instance, via changing the phase between the H and V axis on the pump wave. This phase will not drift considerably over time so the setting of the phase is a rare event.

Adjusting the polarization analyzer to the correct setting becomes more difficult if the entangled light propagates through fiber—particularly if the both the signal and idler propagate through different fibers as will generally be the case. This is because there is an unknown polarization rotation due to birefringence in the fiber. Physical space can no longer be used as a reference and the polarization rotation has two unknown degrees of freedom. One can not easily set the polarization analyzer using the entangled light directly. This is because the entangled light is not polarized so changing the analyzer settings has no effect on the singles counts. One can search for the settings that lead to the desired co-incidence count performance, but this is difficult to do due to the dimensionality of the system (two dimensions on two different detectors) and the fact that co-incidence counts are relatively rare events. Co-incidence counts are rare because losses reduce co-incidences in a quadratic way. If entanglement is distributed over a distance that causes 10 dB of loss and the effective detection efficiency of the single photon detectors are 10% (10 dB loss), then the co-incidence count rate is $1/100^{th}$ of the singles count rate. Additionally, the number of photons generated in one measurement interval in an entangled state is typically much less than one. Thus, the overall co-incidence count rate is fairly low.

It would be beneficial if a polarized high-intensity source could be used to aid in alignment. This would allow one to produce many alignment photons per each measurement interval whereas the entangled state generation typically generates less than one photon per measurement interval. A higher photon rate allows for faster measurement speed and therefore faster alignment. The speed at which the system can be aligned is particularly important in fiber, since the birefringence in fiber changes as a function of time. Thus, being able to quickly determine the correct settings for the polarization analyzer is of importance.

U.S. Pat. No. 6,897,434 deals with the generation of entangled light in fiber. The invention details some methods of dealing with the aforementioned issue. In one method, the pump, signal, and idler wavelengths are all separated in the same free-space system. Thus, they all see similar birefringence in the fiber. Additionally, a signal is injected into the nonlinear fiber which then experiences amplification. This amplified signal can be used to monitor the relative phase between the H and V components of the pump. This phase is adjusted with another free space system to lock it to the desired value. The scheme works well and in a repeatable and systematic manner. However, it is limiting due to the fact that the signal and idler wavelengths propagate through the same fiber even though in general the goal of entanglement distribution is to separate the signal and idler. Additionally it is complex and many free-space components are used. Another design which uses fiber-based filters is also described in U.S. Pat. No. 6,897,434, however the alignment of the scheme would be much more difficult and time consuming since the monitor signal is no longer properly aligned with respect to the signal and idler entangled states. Additionally, all the methods described in this prior art work required substantial manual alignment of the source. Later prior art showed more robust designs, but an efficient method of quickly aligning the polarization analyzers is not described. It is desired to design a robust fiber-based entangled source that is simple to use and for which the polarization analyzers can be aligned quickly.

For applications requiring both entangled photon pairs to be generated in the most useful telecommunication wavelengths (1.3 or 1.55 micron light) Raman scattering limits the performance of fiber-generated entanglement. The Raman effect can be controlled by cooling the fiber, but it is practically desirable to attain similar performance at higher temperatures. In principle it is possible to reduce the Raman effect and thereby reduce or eliminate the cooling burden by spacing the two entangled photon wavelengths, called the signal and idler, suitably close together. However, filtering out the pump with an acceptable extinction becomes more and more difficult as the signal and idler wavelengths approach each other. Because the pump has a very large number of photons per measurement interval and the signal and idler entangled state has less than one photon per measurement interval, very high extinction ratios of the pump—typically on the order of 100 dB—may be required. Spacing the pump/signal/idler close together makes such filtering more difficult. The nonlinearity in the fiber interaction also causes self phase modulation of the pump, thereby expanding its spectrum and possibly contributing to deleterious cross talk.

The invention described here allows for closely spaced signal and idler wavelengths by proper design of both the pump spectrum and the receive filters. In particular, the use of a common narrow-band periodic filter, such as an etalon filter, in combination with standard telecommunication grade filters allows the entangled output to have a narrow bandwidth that is also easily isolated from the huge amount of unwanted pump photons. This configuration is an efficient and convenient method to space the signal and idler wavelengths close together in wavelength thereby reducing the deleterious Raman effect.

It is desirable to have pump/signal/idler filters with a close wavelength separation, a high extinction ratio, and a system design that generates an adequate number of entangled photon pairs. Also it is beneficial to have a system which is flexible, for instance one that can generate entangled pairs at different repetition rates, as well as in a small, robust, and inexpensive way. Pulsed systems are sometimes preferable to continuous wave systems, as it is easier to generate the high peak powers needed to generate nonlinearity in fiber with pulses, and some types of detectors work best in a time-gated mode.

U.S. Pat. No. 6,897,434 generated high quality entanglement (as measured by high visibility two-photon interference fringes) using signal and idler wavelengths which were separated 9 nm from the pump and a thin-film filter with a 0.5 nm filter bandwidth. In order to keep the same pair generation rate and keep self-phase modulation leakage from the pump to the signal the same, one can use the same peak power and reduce the filter bandwidth and wavelength separation in equal proportions. Let us use a figure of merit R=9 nm/0.5 nm=18 to represent the incumbent system wavelength separation-to-bandwidth ratio. All other things being equal, a higher R is better. A lower R may not work well due to SPM leakage and it may also make it difficult to get enough pump extinction. Since we want to bring the signal/idler wavelengths closer together to reduce Raman leakage, our goal is to reduce the wavelength separation as much as possible while still having a large R (>18). To allow for more convenient cooling or, better yet, room temperature operation, we will want to space the wavelengths much closer—say ~1.5 nm or less—while still maintaining a high R parameter. If one can build better filters using some particular technology, such as thin film filters, that have the needed extinction ratios (~100 dB) and low loss at the desired wavelength separation and the appropriate bandwidth (to maintain large R) while still allowing for a convenient laser to be used then one could envision a practical system with quality entanglement at much higher temperatures. Unfortunately, this has not been demonstrated yet because the various constraints are hard to simultaneously satisfy.

To have a large R parameter at a small wavelength separation one needs a relatively narrow filter. For instance, to have an R>18 at about 1.5 nm separation near 1550 nm one needs a filter bandwidth of ~10 GHz. For reasons of stability and convenience (so that, for instance, the laser doesn't need complex frequency locking) it is also not desirable to have too narrow of a filter. As a rule of thumb we might guess that a bandwidth approximately within one order of magnitude of 4 GHz is desirable in the 1550 nm or 1310 nm bands. For instance, with a 1 nm wavelength separation at 1550 nm a 4 GHz filter bandwidth would lead to an R>30 which is better than prior art while at the same time also spacing the wavelengths much closer so as to substantially reduce Raman scattering.

Instead of filtering a wide bandwidth source to produce the pump signal, as was done in U.S. Pat. No. 6,897,434, the designated filter bandwidth range also allows for one to directly carve pulses using, for instance, Mach-Zehnder interferometric modulators or other optical modulators to create optical pulses which have bandwidths that inherently match the filters. It is likely one will also want to filter the carved output to eliminate spurious photons outside this band, however the extinction ratio requirements of the filter are greatly relaxed as opposed to filtering a source with a broad bandwidth that has significant power levels in the undesired signal and idler bands. Additionally it opens up more filtering options since the spectral profile of the pump will largely be determined by the temporal profile of the carved pulse. Note that the repetition rate of the pulses can easily be varied in such a scheme without changing the pulse bandwidth. Since repetition rate can be controlled with electronics, the same optical system is thus well suited for variable pulse rate operation.

The pump can thus be generated via pulse carving. This method is advantageous since the mode-locked lasers, which are usually used for generating high quality entanglement, are more expensive and have a larger footprint. While pulse carving has been used previously to generate entangled photons, (see H Takesue and K. Inone, "Generation of polarization-entangled photon pairs and violation of Bell's inequality," Physical Review A 70, 031802 2004) it did not generate very good performance due to the lack of matched filtering. In this case, an external modulator was used to carve 100 ps pulses, the filters used arrayed waveguide gratings with bandwidths ~25 GHz and the separation between the pump and signal wavelengths are about 400 GHz. The bandwidth of the pump pulse can be estimated to be about 4 GHz based on the temporal duration. Although the R parameter is reasonably good (400 GHz/25 GHz=8), the filters do not match the bandwidth of the pump pulses well at all (the filters are ~25 GHz/4 GHz=6 times too wide). Also, the 400 GHz pump-to-signal separation is too far to allow for low-Raman effects at room temperature. Thus, although external pulse carving was used, the system design of the present invention was not implemented and therefore the desired goals were not met.

It is the object of the present invention to provide a fiber based entangled photon source that is robust, has a built-in method of generating a polarized signal for aiding in aligning the subsequent measurement apparatus, and can be integrated with an appropriate matched filtering scheme to allow for higher temperature operation. Polarization maintaining (PM) components, in some cases including a magneto-optical switching device, are judiciously employed in the invention.

SUMMARY

In one embodiment of the invention, the apparatus is provided for producing entangled photon pairs. It includes a source of a plurality of photons, a polarization maintaining optical circulator and a polarization differential group delay element. One of polarization maintaining connections between the source and the delay element is oriented at a 45 degree angle such that the source photons are split evenly into photons of both polarization axes of the delay element, the photons in each of the two polarization axes are delayed relative to each other before their coupling into a nonlinear optical fiber generating signal and idler photons via a four-wave mixing process. The output of the nonlinear optical fiber is coupled to a non-reciprocal reflector and upon retro-reflection from the reflector back through the nonlinear fiber and the delay element the signal and idler photons in each of the two polarization axes are recombined into an output light with unpolarized entangled photon state that is collected by the polarization maintaining circulator.

In another embodiment, the apparatus of this invention contains a pump laser, a polarization differential group delay (P-DGD) element, a polarization switch that can change the state of polarization of the photons entering the P-DGD element such that the polarization of the light entering the P-DGD element is either aligned along one of the P-DGD polarization axis or split evenly into both polarization axis, and nonlinear fiber for creating signal and idler photon pairs via a four-wave mixing nonlinear interaction. The polarization switch is used to change the operation of the device from producing an unpolarized polarization entangled state into producing a polarized state that is more convenient for aligning the axis of the downstream measurement polarization analyzers. The action of the switch can be electronically controlled to allow for automated operation. The switch can change the entangled source into a quantum correlated source that has a specific polarization relationship with respect to the constituent polarization components of the generated entangled state or, with the addition of an external laser, into a classical polarized light source with a specific polarization relationship with respect to the constituent polarization components of the generated entangled state.

The apparatus may further include at least one optical element connected to the circulator for compensating polarization mode dispersion in output photons. In particular, a compensated polarization mode dispersion experienced by source photons from an input to an output of the apparatus is less than $1/10^{th}$ the inverse bandwidth of the filters used to define the signal and idler wavebands.

In one embodiment, the polarization switch is of a non-reciprocal type switch based on the magneto-optical effect. The differential polarization delay element may be realized using a birefringent crystal.

In a further aspect of the invention, polarization maintaining fiber components are configured in such a way that the generated entangled state is stable and requires little or no manual alignment. One or more Faraday mirrors can be employed to aid in the system stability.

In yet another embodiment of the invention, an apparatus for producing quantum correlated and/or entangled photon pairs is provided. It includes a source of a plurality of photons, which is connected to a polarization controller followed by an optical circulator and then a differential polarization group delay element. The output of the delay element is connected to a coupler with two output ports, wherein one output port is connected to a monitor that measures information about the monitor optical input signal, said monitor sends the information to a feedback control element that uses a polarization information to adjust the polarization controller to either measure a single polarization at the monitor or an unpolarized signal at the monitor. The other coupler output port is connected to a nonlinear fiber wherein four-wave mixing in the nonlinear fiber generates signal and idler photons. The nonlinear fiber is connected to a non-reciprocal reflector such that after the photons are retro-reflected back through the nonlinear fiber and the polarization differential group delay element, the reflected photons are collected by the circulator to produce output photons. The output photons are in an entangled state if the feedback control element configures the polarization controller in the way that an unpolarized state is measured at the monitor or in a polarized quantum correlated state if the feedback control element configures the polarization controller in the way that a polarized state is measured at the monitor. The monitor may realized as a degree of polarization meter. The apparatus may further include an alignment laser source emitting alignment light at the signal and idler wavelengths whose optical output is combined with an output of the source of plurality of photons before the polarization controller; the alignment light being used for generating polarized output alignment photons; the alignment photons have a fixed relationship with respect to both polarization axes of the differential group delay element.

In a further aspect of the invention, a matched filtering scheme is used on the pump, signal, and idler photons such that the separated signal and idler spectra approximately match the pump spectra, the signal and idler wavebands are located close together in wavelength, and the pump is still suitably isolated. The close spacing of the signal and idler wavebands is done for the purpose of improving the entanglement quality by reducing Raman scattering. However, it also allows for the generation of many high quality entangled photon pairs simultaneously, which would be difficult without such close spacing due to the Raman effect which increases as the wavelengths are further separated. The use of a periodic filter such as an etalon which can be used to filter both the signal and idler is another aspect of the invention that aids in spacing the signal and idler wavebands closely.

A method for producing entangled photon pairs is provided. It includes generating a plurality of photons in a source photons; coupling the source photons into a polarization maintaining optical circulator followed by a polarization switch and then a differential polarization group delay element; switching the polarization switch between a first and second position; in the first position the source photons being split evenly into photons with both polarization axes of the delay element and in the second position the source photons having one polarization axis of the delay element; coupling the output of the delay element into a nonlinear fiber producing signal and idler photons through a four-wave mixing interaction, reflecting an output signal from the nonlinear fiber by a non-reciprocal reflector causing the photons being retro-reflected back through the nonlinear fiber and the delay element, collecting the reflected photons by the polarization maintaining circulator to produce output photons, wherein said output photons being in an entangled state if the polarization switch is in the first position and a quantum correlated state if the polarization switch is in the second position.

DETAILED DESCRIPTION

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art.

Figure 2:
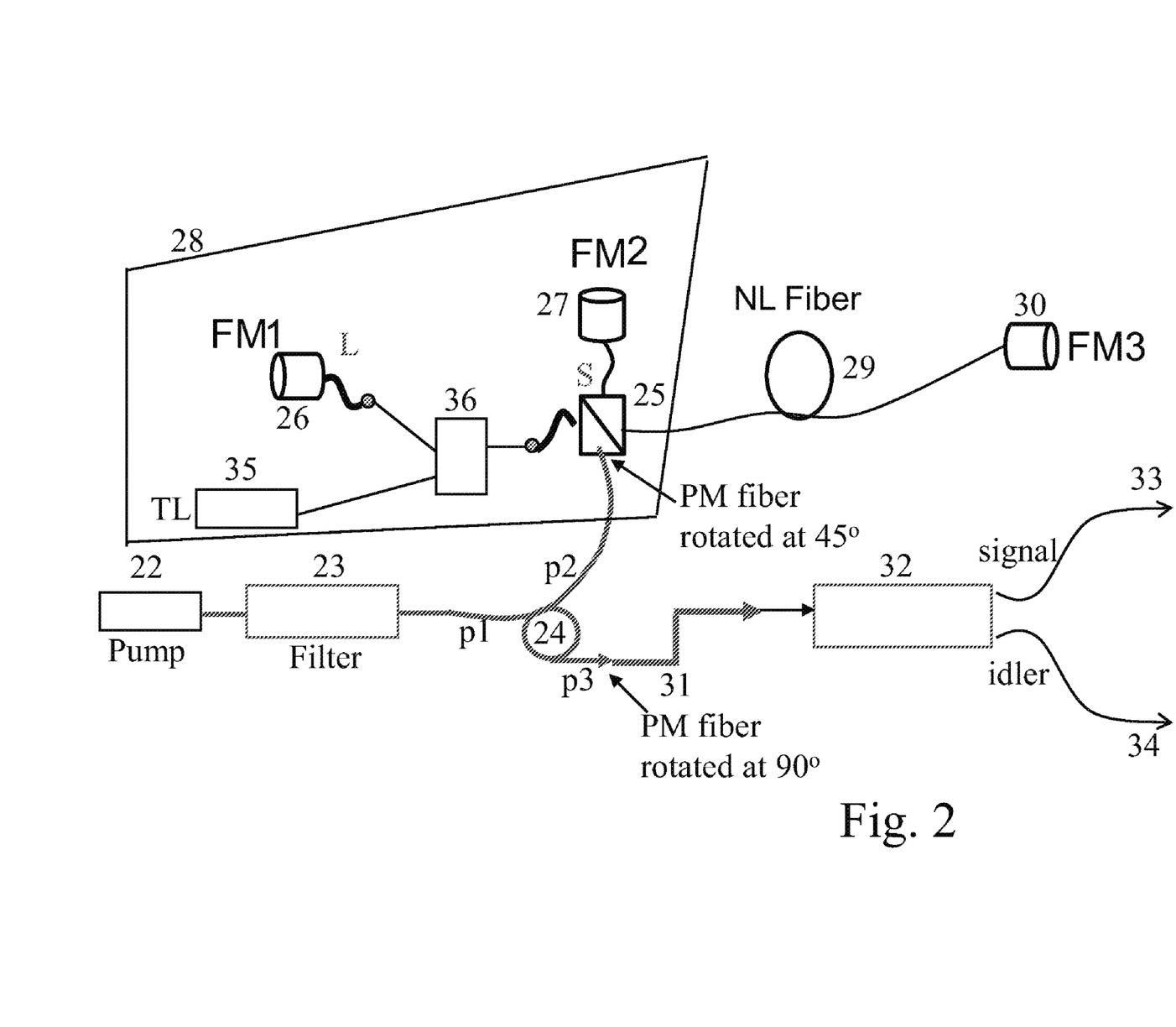
FIG. 2 shows one embodiment of the entangled photon source according to the present invention, which uses an external laser to help align the entangled state to the polarization analyzers (not shown) that would be used to detect the signal and idler outputs.

FIG. 2 shows a system which allows for convenient alignment of the polarization elements in the subsequent polarization analyzer used to observe two-photon interference with the entangled output. The use of polarization maintaining (PM) fiber components with appropriate orientation allows for the entanglement source itself not to require any alignment. The pump laser 22 is polarized along one axis of the PM fiber. It could optionally be amplified in a PM amplifier or a standard amplifier followed by polarization control and a polarizer. A PM filter 23 is used to filter out spurious pump light. The pump light then enters a PM circulator 24. The PM circulator should be constructed in such a way so that it circulates both polarization modes of the PM fiber. The PM circulator output labeled p2 is rotated to be at 45 degrees with respect to the polarization beam splitter 25 (PBS), thereby splitting the laser light equally between the two arm of the Michelson interferometer. The two arms of the Michelson interferometer are of slightly different length such that upon reflection from the Faraday mirrors 26,27 and re-passing through the PBS 25 the pump photons are split into two time-delayed version that are orthogonal in polarization, thus creating a polarization differential group delay (P-DGD) element 28. The orthogonal pump photons induce a four-wave mixing nonlinear interaction in the nonlinear fiber 29 which creates signal and idler photons, the resulting photons being retro-reflected by the Faraday mirror 30 back through the nonlinear fiber 29 and the P-DGD element 28 such that an entangled state is generated, collected by the circulator 24, and filtered with a wavelength division multiplexed (WDM) filter. Note that an optional PM fiber 31 before the WDM filters 32 is oriented such that it compensates for the polarization mode dispersion (PMD) that the pump experiences from the input to the output of the circulator. The orientation of this PM segment is thus such that the slow axes of the compensation PM segment is aligned to the fast axis of the previous PM fiber. Note that there are many ways the PMD compensation could be integrated into the system by controlling the amount and direction (relative slow-to-fast axis alignment) of the individual PM components which add PMD. The desired end result is that the PMD the pump experiences is a small fraction of the inverse bandwidth of the signal and idler filters 32 used in the system. For instance, if the pump, signal, and idler filters have a bandwidth of 50 GHz then the net PMD the pump experiences from the input to the output of the circulator should be less than 1/10 part: (1/10)*(1/50 GHz)=2 ps.

The pump light of FIG. 2 is always properly aligned and the entanglement source itself does not require alignment. The wavelength division multiplexer (WDM) filter 32 separates the signal 33 and idler 34 so they can propagate over different fibers if desired. This component can be located after the propagation fiber if the signal and idler are intended to co-propagate down a common fiber. Although the pump does not require alignment to generate the entangled light, the downstream polarization analyzers used to measure the signal 33 and idler 34 outputs must be properly aligned. This can be done by injecting polarized light to the PBS 25 from the external tunable laser 35. In one arm of the interferometer a PM switch 36 allows the connection between the PBS 25 and the Faraday Rotator 26 to be broken and an external signal to be injected from a tunable laser 35 (or two static lasers or one static dual-wavelength laser) into the system if desired. Note that the same function could also be performed by replacing the PM switch with fiber connectors that are manually re-configurable. The alignment laser wavelength is tuned to be either at the center of the signal or idler wavelengths in order to adjust the analyzer before either the signal or idler detector respectively. The alignment laser is polarized such that it passes through the PBS 25 and propagates through the non-linear fiber 29. The light is then reflected from the faraday mirror 30 and propagates back through the fiber. The light is then reflected by the polarization beam splitter (PBS) 25 to the other Faraday mirror 27 and then reflected such that it passes through the PBS 25 into port p2 of the PM circulator 24. Since this PM port is aligned at 45 degrees to the PBS axis, both PM modes are injected with light. Thus the injected light experiences the same birefringence as the entangled light would experience and the downstream analyzer can be adjusted by adjusting the analyzer waveplates to, for instance, minimize the received optical power. This will compensate for the birefringence before the detectors and allow for the proper settings of the analyzer for measurement of a two-photon interference fringe. Once aligned, the PM switch 36 can be reconfigured so that the Faraday mirror 26 is connected to the PBS 25 and the pump laser can be turned on. This will create entangled light that can be directly measured using the pre-aligned polarization analyzers.

Figure 3:
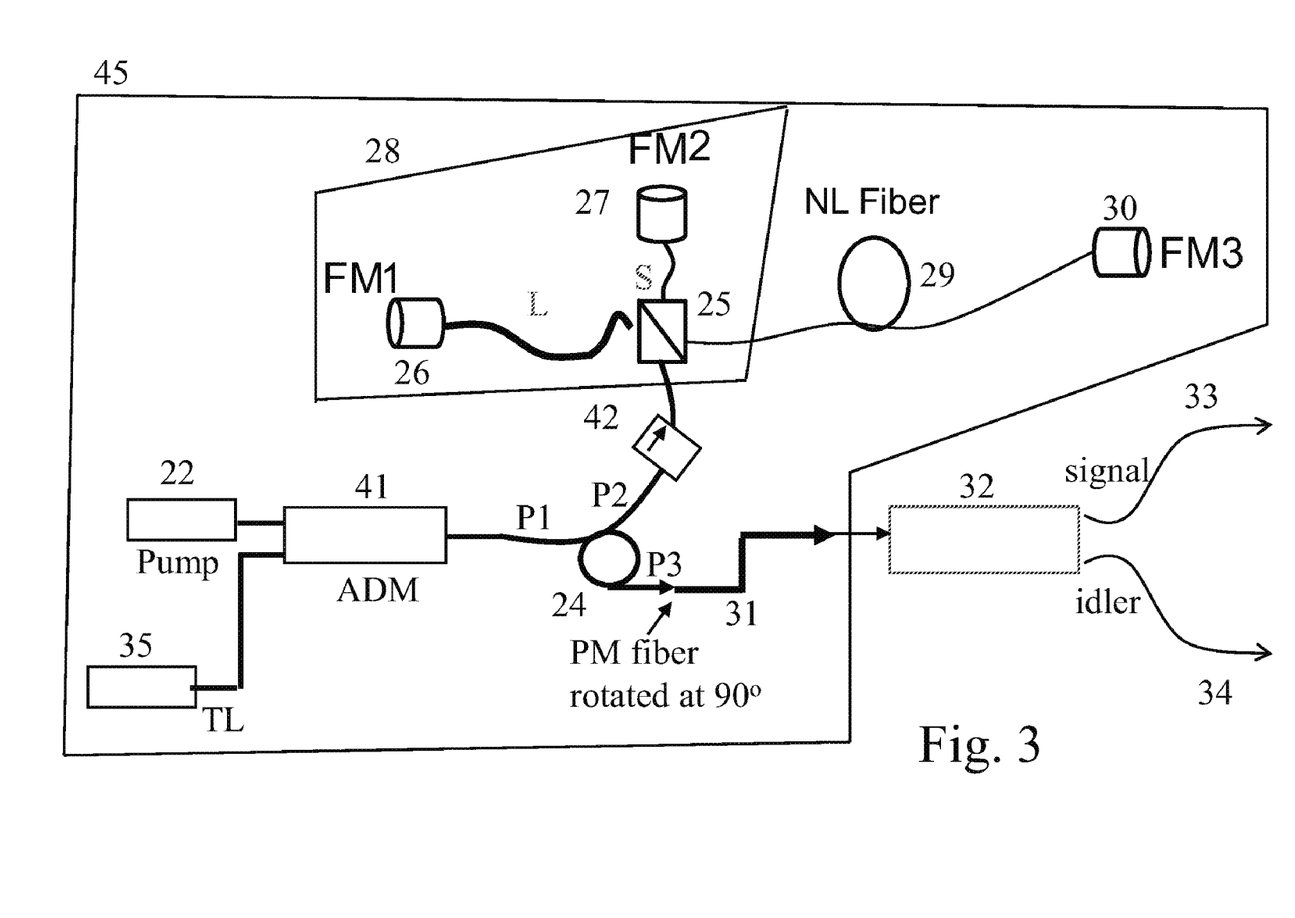
FIG. 3 is another embodiment of the entangled photon source which can use an external laser for alignment. A polarization switch such as a magneto-optical switch is used to select if the system is set to produce a polarized alignment output signal or an unpolarized entangled output. The system can also be aligned without the external laser using only the four wave mixing signal generated by the pump.

Another embodiment of the polarization entangled source is shown in FIG. 3 which incorporates an automated polarization switching scheme in order to aid in alignment. The end result is a design which does not require any alignment to generate the entangled state and contains an alignment signal to aid in aligning the polarization analyzers used to measure the entangled light.

The entangled photon source (EPS) in FIG. 3 scheme is suitable for automated alignment. Similar to FIG. 2 it uses a P-DGD element 28 composed of a PBS 25 and Faraday mirrors 26, 27. The system as shown will generate polarization mode entanglement, but other forms of entanglement such as hyperentanglement are possible with modifications that would be apparent to one skilled in the art. The design uses polarization maintaining (PM) components before the PBS 25 including PM add-drop multiplexer (ADM) 41, a PM fiber amplifier (if needed based on the laser output power), and a PM circulator 24. However there is now the inclusion of a polarization switch (PS) 42. A polarization switch is an optical device which can manipulate the polarization of the light passing through the device according to some external control such as a control voltage. In one embodiment the PS is made using a magneto-optical (MO) device. Since light passes through the MO device in both directions in this design the properties of the MO device in both propagation directions are important (the polarization transformation of the MO device is non-reciprocal).

In a modified embodiment the PS can be placed before the PM Circulator 24 and made using any type of polarization switch that allows for a controllable 45 degree rotation of the input signal when the pump photons are initially aligned along one of the PM axis of the fiber. In this case the PS is before the circulator so its performance in only one direction (input-to-output) is important.

The non-reciprocal PS device 42 used in the design of FIG. 3 has the following characteristics. If the voltage is of a set point "A" (the alignment setting) then a signal traveling along a PM axis through the device in the direction of the arrow will stay on that axis. If the voltage is of set point "B" then the same signal will rotate 45 degrees with respect to the axis thereby being split approximately equally along the two axes (this is a 90 degree rotation according to a Poincare Sphere representation). If a signal is along one of the PM axes and propagates through the PS device in the opposite direction as the arrow then set point "A" will rotate it 45 degrees. If the signal is propagating in the opposite direction as the arrow and it is split 50/50 along both axes then setpoint "B" will keep the 50/50 condition. Such a PS could be constructed using PM fiber and a magneto-optical (MO) component with appropriate relative orientations and such devices are commercially available.

In order to align the waveplates before the detectors, a method for accounting for the effective birefringence seen by the entangled state between the generation and measurement process should be incorporated. In the design of FIG. 3 a polarized entangled state could generate photons along either axis of the PM fiber, and these two polarizations represent the constituent polarizations of the unpolarized entangled state output. Thus, for alignment purposes it is useful to be able to generate a well defined polarization state that has a specific orientation with respect to the two axes. The downstream polarization analyzers can be aligned using such a state.

One particularly useful such polarization state is a state which has components along both axes what have the same phase relationship between them as the two constituent components of the pump photons. This allows the polarization analyzer to be aligned very quickly in order to observe a two-photon interference fringe, since the phase information between the two constituent polarization components is maintained, and that phase component affects the proper setting of the analyzer. Considering the design of FIG. 3, this desired alignment is created when the PS 42 is set to pass the input pump along the input PM axis without any rotation, which is the setpoint "A" setting. In this case the nonlinear process of four wave mixing (FWM) in the fiber generates light in one particular polarization mode. Upon the FWM signals exiting the PBS 25 the signal is rotated 45 degrees by the PS 42 and split roughly equally into both polarization axis of the PM fiber. This signal is propagated to the signal and idler outputs and the output state of polarization is determined by the birefringence of the fiber. The birefringence can be compensated with the analyzer waveplates, for instance by adjusting them for a minimum number of signal or idler photon counts. Switching the setpoint of the PS to setpoint "B" then allows for generation of unpolarized entangled light.

Alternatively an external laser 35 of the same center optical wavelength of the signal and idler can be injected into the system along one of the PBS 25 axes. This could be accomplished by, for instance, using a PM add-drop multiplexer (ADM) 41 before the PM circulator 24, although other methods of combining the laser light such as a combiner could also be used. The ADM also serves to filter stray light from the pump laser. In this way a large signal from an external laser instead of a weaker signal generated via four wave mixing in the fiber can be used to align the waveplates, allowing for a higher signal-to-noise ratio at the analyzer and thus a faster alignment. The larger power allows the possibility for a simple power meter to be used instead of single photon detectors. To align the system the PS 42 would be set to setpoint "A" (which could also be called the alignment setpoint) and the tunable laser 35 would be tuned to the appropriate wavelength (signal or idler) for aligning the given analyzer. The analyzer can be tuned to, for instance, minimize the received signal. Once the alignment is completed the external laser is shut off and the pump laser is turned on. The setpoint of the PS is switched to setpoint "B" which then creates the desired entangled state.

Figure 4:
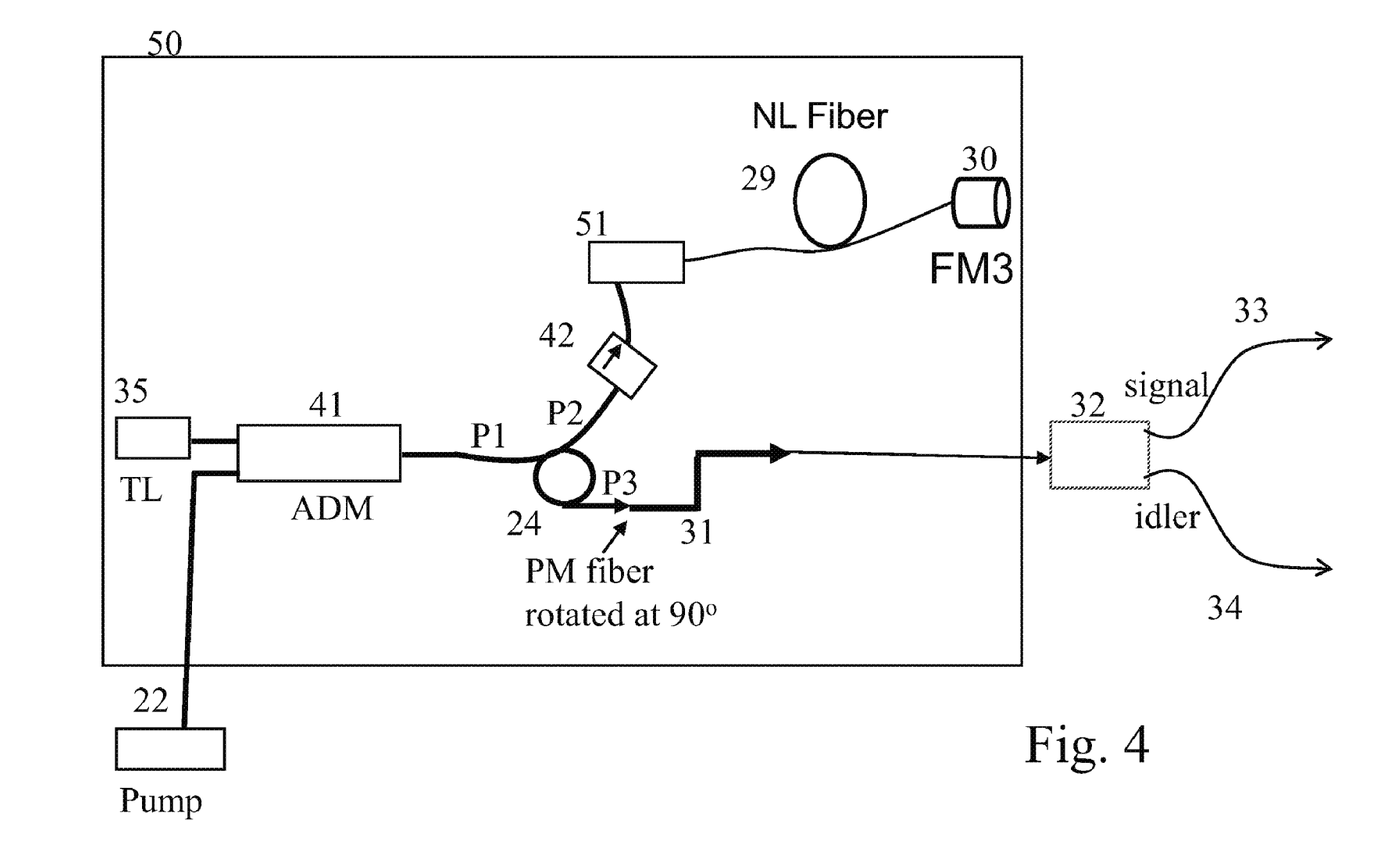
FIG. 4 is an embodiment of the entangled photon source which uses a birefringent waveplate to separate the pump photons into two orthogonally polarized components separated in time for the purposes of creating the entangled light.

FIG. 4 is another embodiment of the invention. FIG. 4 is similar to FIG. 3, however, the P-DGD element 51 is realized with a single birefringent crystal. All other components are the same, so we have used the same numbering scheme. The polarization into the crystal is controlled by the magneto-optical PS switch 42 or it can be alternatively fixed to a 45 degree angle as in FIG. 2. The use of a birefringent crystal simplifies the setup over the use of a beam cube and additional Faraday rotators, thus reducing the number of components and their associated losses. Desirable birefringent crystals with appropriate differential group delays, where in general the differential group delay should be at least on the order of the temporal response of the single photon detector used so that Raman pulses generated outside the entanglement window can be discriminated against, are commercially available. In the case of gated avalanche photo-detectors of the type commonly used, a 1 ns temporal window is a typical value thus suggesting a 1 ns differential group delay in the birefringent crystal. Note that in principle a PM fiber could be used instead of a birefringent crystal to add the appropriate differential group delay, but Raman noise is generated in the fiber thus degrading the performance. The use of a Faraday mirror 30 still makes the scheme very stable even if the crystal birefringence varies with temperature. A birefringent crystal is thus a preferred method to create the two orthogonal pump pulses which enter the nonlinear fiber 29.

Figure 5:
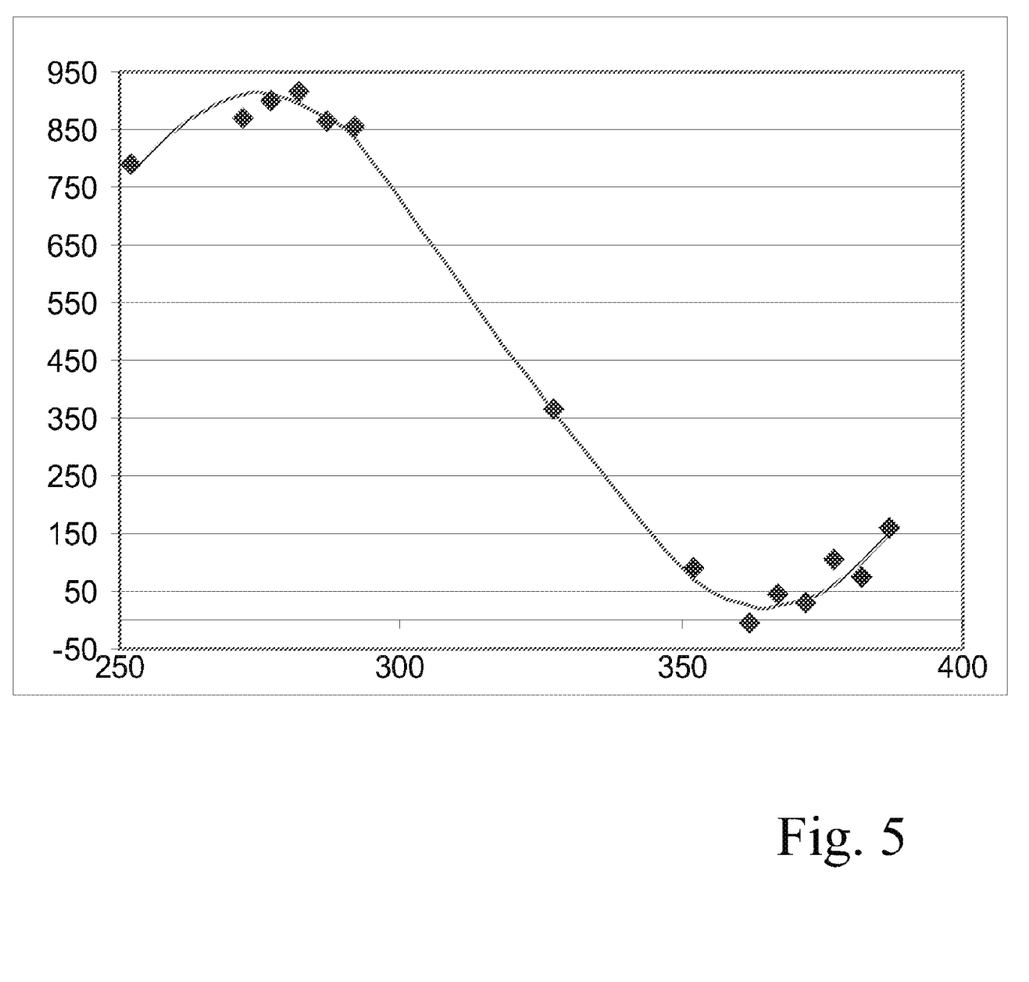
FIG. 5 shows a measured two-photon interference curve where the y-axis are the co-incidence counts and the x-axis is the effective rotation angle of the rotating polarizer at the polarization analyzer. The polarization analyzer is initially aligned using a polarized alignment output signal.
Figure 6:
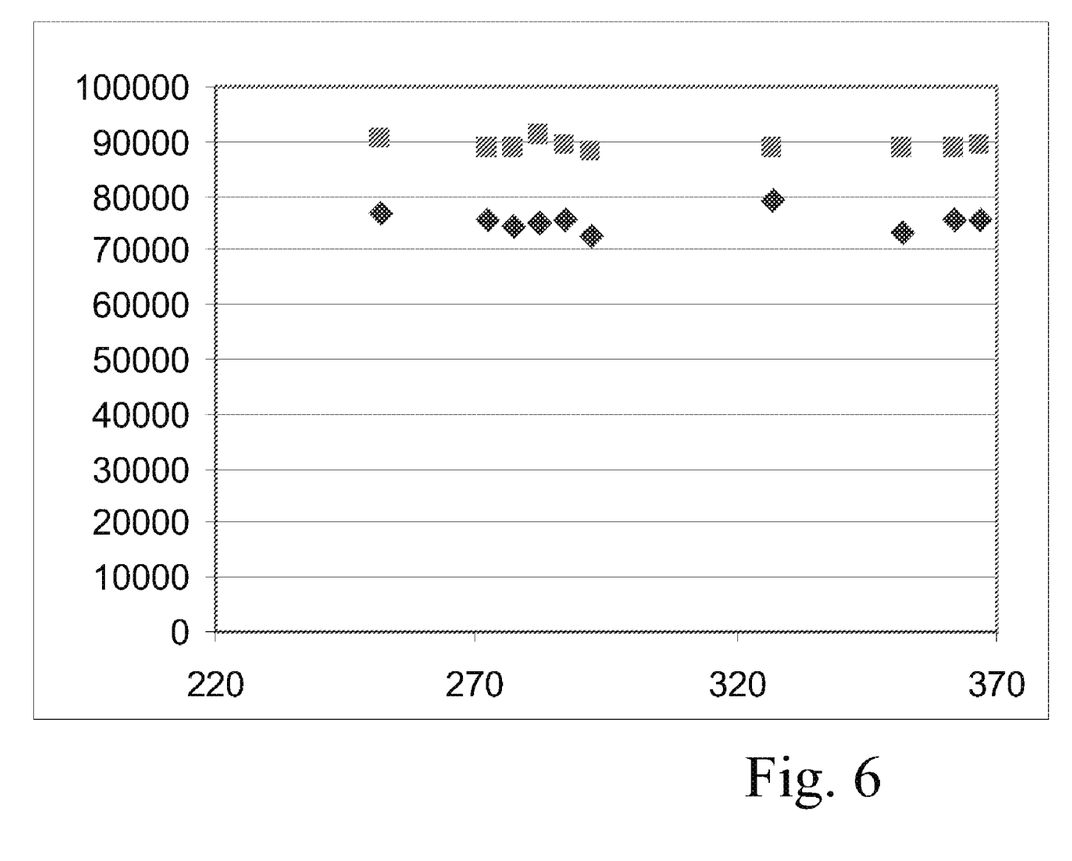
FIG. 6 shows the single photon counts corresponding to the two-photon interference curve of FIG. 5. The y-axis are the singles counts and the x-axis is the effective rotation angle of the rotating polarizer at the polarization analyzer. The signal (square) and idler (diamond) single photon counts are flat showing that there is no traditional photon interference. Ideally the singles counts should be the same for both the signal and the idler—the small measured difference is due to differences in the losses of the signal and idler arms including the detection efficiency of the single photon detectors.

FIG. 5 shows an example of a two-photon interference fringe. The x-axis is the effective rotation of one of the rotatable polarizers in the two analyzers and the y-axis are the correlated photon counts. The fringe is taken after aligning the polarization analyzers using a polarized alignment signal. The two-photon interference is immediately apparent after aligning the analyzers to the alignment signal. FIG. 6 shows the corresponding single photon counts for both the signal and the idler, which are nearly constant as expected for unpolarized entangled light.

Figure 7:
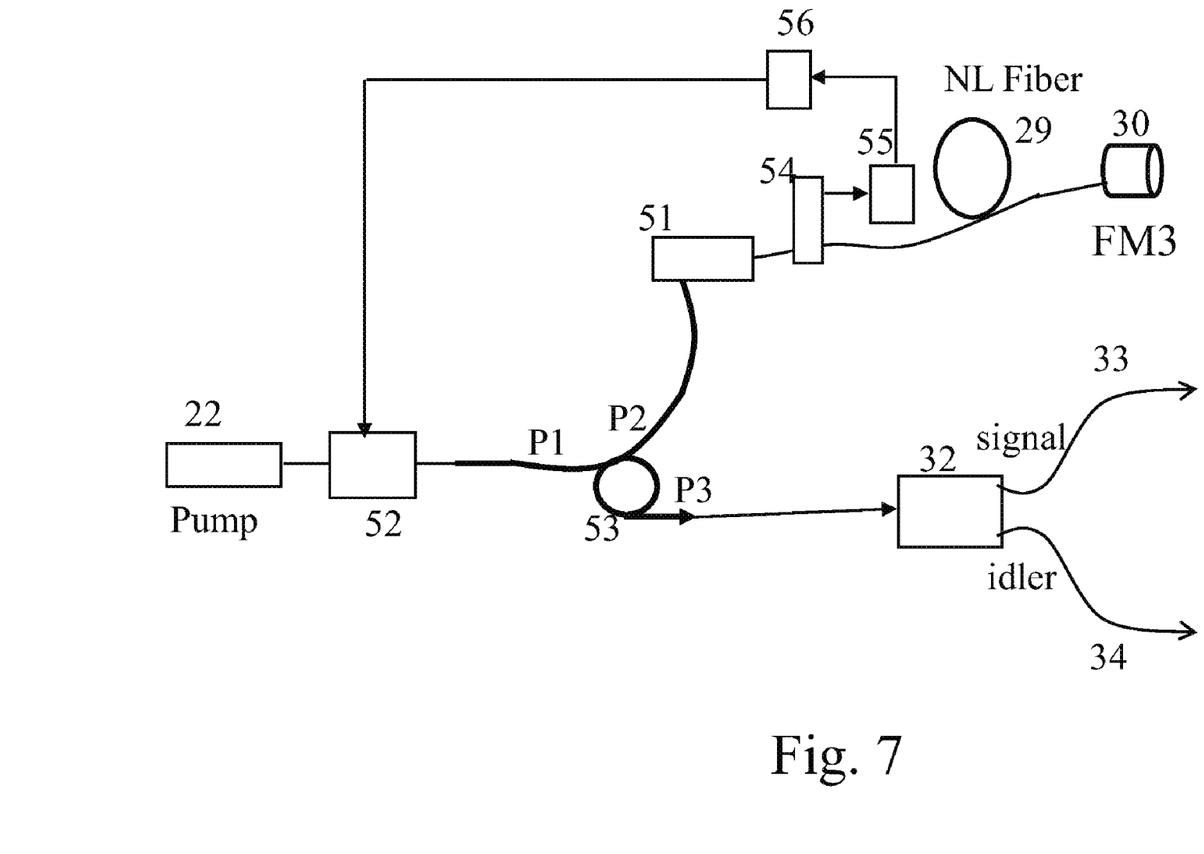
FIG. 7 is an embodiment of the entangled photon source which uses non-polarization maintaining fiber.

FIG. 7 shows another embodiment of the invention. In this embodiment the optical fibers and components connecting the source of pump photons 22 to the P-DGD element 51 can be standard non-polarization maintaining fiber. The polarization of the pump photons is instead controlled by a polarization controller 52 which feeds a circulator 53 followed by the P-DGD element 51. A coupler 54 after the P-DGD element sends a portion of the pump photons to a monitor 55. The monitor produces an electrical signal related to the input optical signal which is processed inside the feedback control 56. In this implementation the monitor can be realized as a polarimeter that measures the degree of polarization (DOP) of the input optical signal. When the DOP is minimized then the signal into the P-DGD is configured such that half of the output photons are polarized along each one of the P-DGD axes. When the DOP is maximized then the output photons are polarized along just one of the P-DGD axes. In order to generate a polarized output signal, the feedback control 56 adjusts the polarization controller 52 so that the monitor 55 measures a maximum DOP. In order to generate an unpolarized entangled output, the feedback control 56 adjusts the polarization controller 52 so that the monitor 55 measures a minimum DOP. The nonlinear fiber 29, Faraday mirror 30, and WDM filter 32 function in the same manner as in FIG. 4. As in previous implementations, an external alignment laser could be added to the system. In this case, the optional alignment laser would be combined with the pump before the polarization controller 52.

Figure 8:
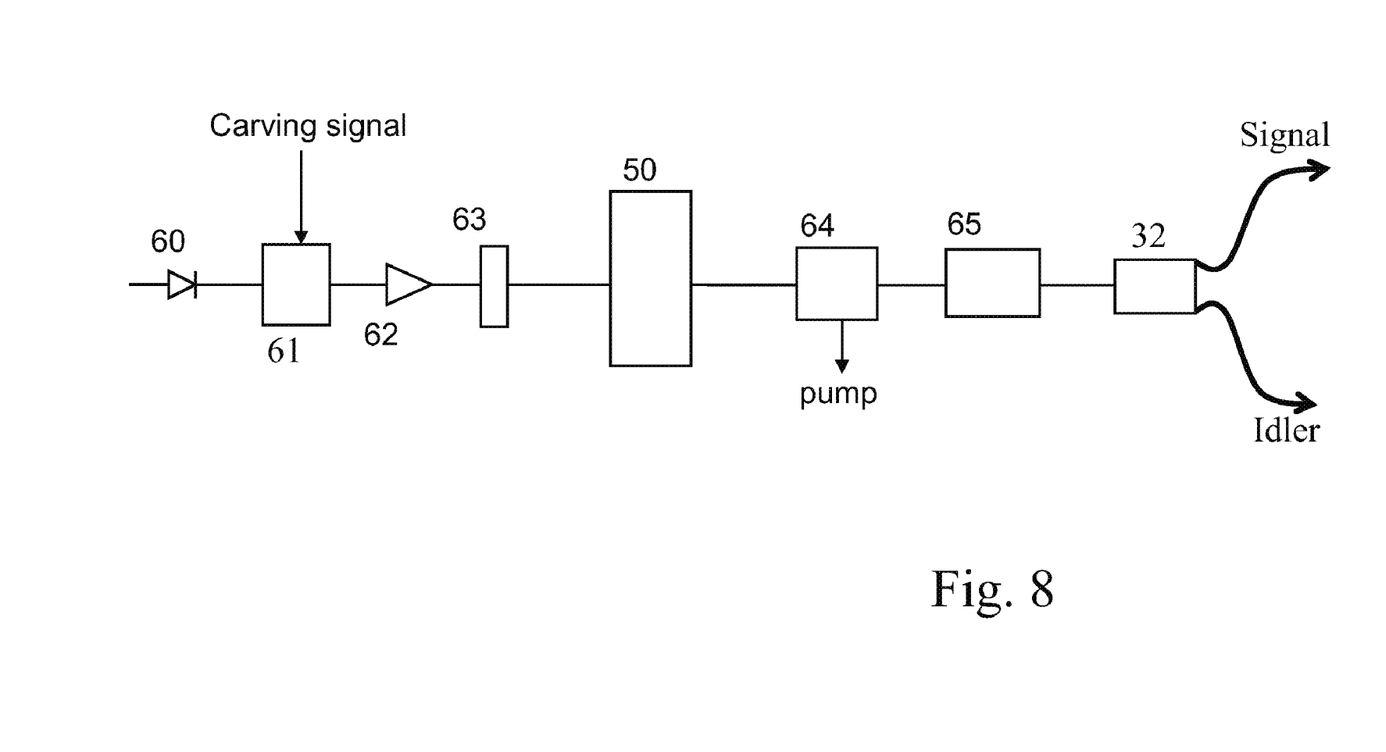
FIG. 8 shows one method of matching the source and filter bandwidths to allow for efficient entanglement generation in an entanglement apparatus. Here the pump is made by carving a laser with an external modulator. A narrow band periodic filter, which could be based on an etalon, that has a bandwidth approximately the same spectral profile as the carved pump defines both the signal and idler spectrum while a WDM filter separates the signal and idler for subsequent detection.

A further improvement on prior art is to reduce the deleterious Raman effect. One embodiment of the invention is shown in FIG. 8. Here we use an EPS 50 similar to FIG. 4, although other EPS architectures could also be used possibly requiring small changes which would be apparent to one skilled in the art. A laser 60 which is modulated by an external modulator 61 is optionally amplified in an optical amplifier 62. The optical amplifier is used if the power of the laser is not sufficient to generate enough nonlinearity in the subsequent nonlinear fiber located inside the EPS 50. Typically the pump pulses will be of a low duty cycle such that the peak power after the amplifier is high. For instance, the modulated pump pulses may be 100 ps full-width-half-maximum pulses at a repetition rate of 100 Mhz, thereby having a duty cycle of 1/100. If the maximum average power out of the optical amplifier 62 is 50 mW, then on the order of 5 W of peak power is at the output of the amplifier. This is substantial power which can be used as a pump in the nonlinear fiber, even though the optical amplifier can be an inexpensive type with relatively low average output power. A filter 63 is used to filter out excess amplified stimulated emission from the amplifier, although the spectral profile of the pump is primarily determined from the temporal characteristics of the modulated signal. For instance, for the 100 ps pulses the pump spectrum is approximately 0.4/100 ps=4 GHz.

Figure 9:
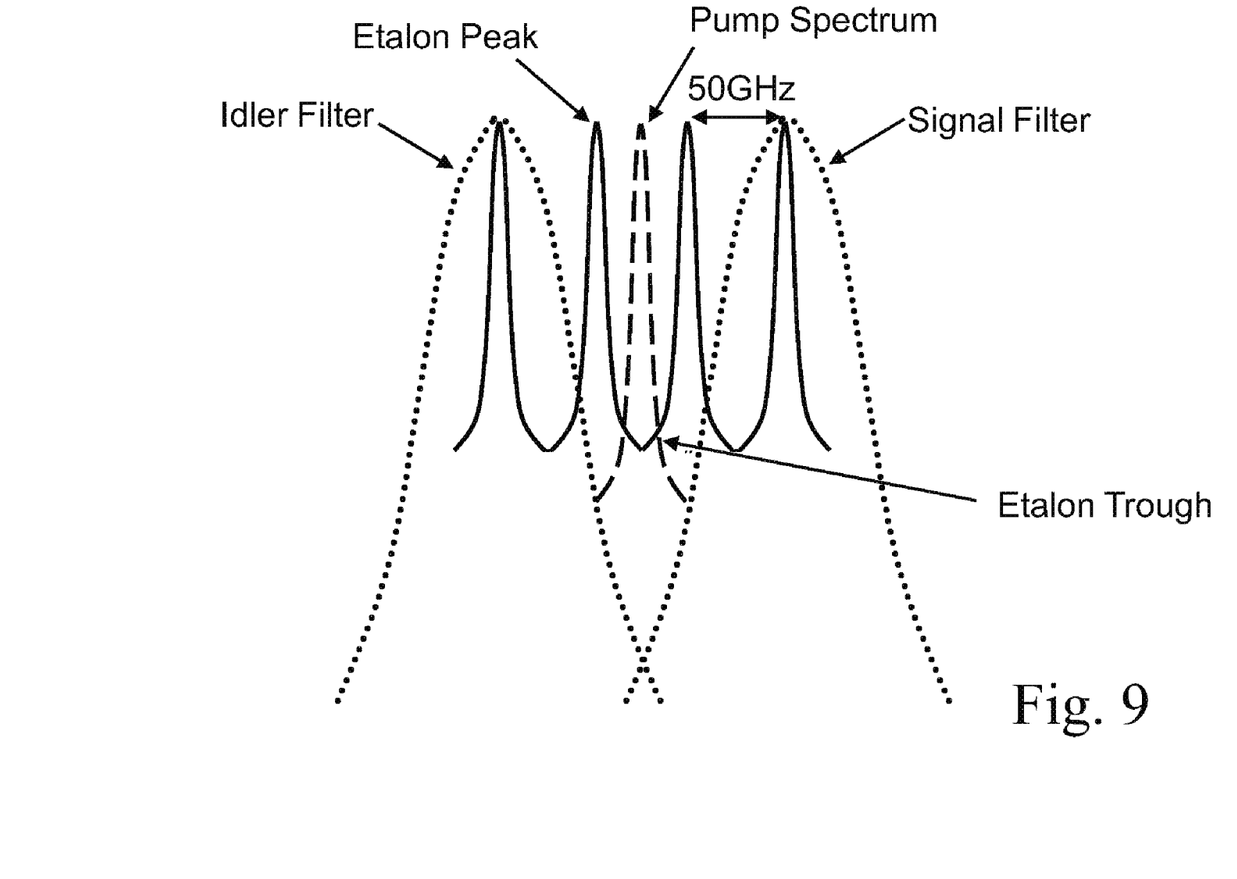
FIG. 9 illustrates the spectral profile of the filters and pump from FIG. 8. A periodic narrow-band etalon filter defines the signal/idler measurement and also helps to reject the pump. Wider band, but higher rejection ratio, filters are overlayed to separate the various wavebands.

Although the bandwidth of the pump is about 4 GHz, commonly available high extinction ratio filters 63 such as thin film filters with bandwidths of 10's of GHz, can be cascaded to make sure that there is no (<100 dB down) pump leakage in the signal or idler bands, which we assume are spaced 75 GHz (~0.6 nm) away from the pump. The pump then propagates though the EPS 50. After the nonlinear interaction the pump can be largely filtered away with a standard add-drop multiplexer (ADM) 64. The signal and idler are then both filtered using a narrow periodic filter 65 which is approximately matched to the pump bandwidth (a 4 GHz). This filter can be realized, for instance, with a solid core etalon. Other filters such as Fiber Fabry-Perot filter could in principle be used, although the solid etalon is a convenient and typically inexpensive choice. FIG. 9 shows the spectral profile of the periodic filter as well as the spectral location of the pump and the signal/idler WDM filters 32. The periodic filter is used to define the bandwidth of the measurement, and can be chosen primarily based on their bandwidth properties since extinction ratio issues can be handled by separate WDM filters 32. Since the Etalon transfer function is periodic, the unwanted pump leakage can be further filtered by placing the pump spectrum in the null of the etalon transmission as depicted in FIG. 9. In so doing, we get extra extinction of the pump wave without requiring additional filters which may have additional insertion loss. In this example the actual etalon peaks used to filter the signal and idler are 3 peaks apart. This is not necessary as an etalon could be designed with a free spectral range such that the signal and idler sit on neighboring peaks, or some other integer. However, we are assuming here a common type of Etalon with 50 GHz free-spectral range and thus to achieve the pump-to-signal frequency spacing of 75 GHz we have two peaks separating the signal and idler bands. In this case our R parameter will be 75 GHz/4 GHz=18.75. This large value is obtained despite the very close pump-to-signal wavelength separation of 75 GHz or ~0.6 nm. Thus the Raman gain will be small. Note that the Finesse of the etalon is 50 GHz/4 GHz=12.5, which is in line with low-cost etalons commercially available. Typically the bandwidth of the filter passband will be narrow with respect to the separation between pump and signal wavebands, for instance the bandwidth will usually be $<1/10^{th}$ the waveband separation. Such a configuration allows the bands to be separated by commonly available, high extinction ratio filters. These other filters can be made using various technologies such as thin-film, fiber-Bragg grating, or arrayed-waveguide filters, to provide adequate extinction of the residual pump photons and to separate the signal and idler bands before detection.

We note that with this method we can easily change the repetition rate of the source without significantly changing its spectral bandwidth. Additionally, the ability to space signal and idler bands close together and use a single periodic filter to define their bandwidths lends itself to the production of multiple signal and idler bands. Thus, the invention is well suited to generating multiple high quality entangled photon pairs, which can be separated after the periodic filter using standard DWDM filtering technology. Finally we note that the 1310 nm band can be serviced with similar designs making only minor changes, such as switching to 1310 nm compatible optics.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for producing entangled photon pairs, said apparatus comprising:
a source of a plurality of photons; the source connected to a polarization maintaining optical circulator followed by a polarization differential group delay element, wherein one of polarization maintaining connections between the source and the delay element being oriented at a 45 degree angle in the way that the source photons are split evenly into photons of both polarization axes of the delay element,
the photons in each of the two polarization axes being delayed relative to each other before being coupled into a nonlinear optical fiber generating signal and idler photons via a four-wave mixing process; an output of the nonlinear optical fiber being coupled to a non-reciprocal reflector and upon retro-reflection from the reflector back through the nonlinear fiber and the polarization differential group delay element the signal and idler photons in each of the two polarization axes are recombined into an output light with unpolarized entangled photon state that is collected by the polarization maintaining circulator, further comprising: an external laser source emitting external laser photons at the signal and idler wavelengths being injected into the polarization differential group delay element for the purposes of creating a polarized alignment signal to be used to align polarization apparatuses to a specified axis with respect to both polarized components of the output light.

2. The apparatus of claim 1, wherein the non-reciprocal reflector is a Faraday mirror.

3. Apparatus for producing quantum correlated and/or entangled photon pairs, said apparatus comprising:
a source of a plurality of photons; the source connected to a polarization maintaining optical circulator followed by a polarization switch and then a differential polarization group delay element; the polarization switch operating in a first and second position; in the first position the source photons are split evenly into photons with both polarization axes of the differential polarization group delay element and in the second position the source photons are aligned to one polarization axis of the delay element; the output of the delay element being coupled into a nonlinear fiber producing signal and idler photons through a four-wave mixing interaction, the nonlinear fiber being coupled to a non-reciprocal reflector causing the photons to be retro-reflected back through the nonlinear fiber and the group delay element, the reflected photons being collected by the polarization maintaining circulator to produce output photons, said output photons being in an entangled state if the polarization switch is in the first position and a quantum correlated state if the polarization switch is in the second position.

4. The apparatus according to claim 3, further comprising an alignment laser source emitting light at the signal and idler wavelengths is coupled into the polarization maintaining circulator; the alignment light being used for generating polarized output alignment photons; the alignment photons having a fixed relationship with respect to both polarization axes of the differential group delay element.

5. The apparatus according to claim 3, further comprising at least one optical element connected to the circulator for compensating polarization mode dispersion in output photons.

6. The apparatus according to claim 5, wherein a compensated polarization mode dispersion experienced by source photons from an input to an output of the apparatus is less than $1/10.\text{sup.th}$ the inverse bandwidth of the filters used to define the signal and idler wavebands.

7. The apparatus according to claim 5, wherein the optical element having polarization differential group delay being aligned at a 90 degree angle to the axes of other elements with polarization differential group delay to cancel out the differential delays.

8. The apparatus according to claim 3, wherein the polarization switch is of a non-reciprocal type.

9. The apparatus according to claim 8, wherein the non-reciprocal polarization switch based on the magneto-optical effect.

10. The apparatus according to claim 3, wherein the differential polarization delay element is realized using a birefringent crystal.

11. Apparatus for producing quantum correlated and/or entangled photon pairs, said apparatus comprising: a source of a plurality of photons; the source connected to a polarization controller followed by an optical circulator and then a differential polarization group delay element; the output of the delay element being connected to a coupler with two output ports, wherein one output port is connected to a monitor that measures information about the monitor optical input signal, said monitor sending the information to a feedback control element that uses a polarization information to adjust the polarization controller to either measure a single polarization at the monitor or an unpolarized signal at the monitor and wherein the other coupler output port is connected to a nonlinear fiber, wherein four-wave mixing in the nonlinear fiber generates signal and idler photons, said nonlinear fiber being connected to a non-reciprocal reflector such that after the photons are retro-reflected back through the nonlinear fiber and the polarization differential group delay element, the reflected photons being collected by the circulator to produce output photons, said output photons being in an entangled state if the feedback control element configures the polarization controller in the way that an unpolarized state is measured at the monitor or in a polarized quantum correlated state if the feedback control element configures the polarization controller in the way that a polarized state is measured at the monitor.

12. The apparatus of claim 11, wherein the non-reciprocal reflector is realized by a Faraday mirror.

13. The apparatus of claim 11, wherein the monitor is realized by a degree of polarization meter.

14. The apparatus of claim 11, wherein the differential polarization group delay element uses a birefringent crystal.

15. The apparatus according to claim 11, further comprising: an alignment laser source emitting alignment light at the signal and idler wavelengths whose optical output is combined with an output of the source of plurality of photons before the polarization controller; the alignment light being used for generating polarized output alignment photons; the alignment photons having a fixed relationship with respect to both polarization axes of the differential group delay element.

16. Apparatus for producing entangled photon pairs, said apparatus comprising: a pump source of a plurality of photons, a modulator connected to the source of photons; the modulator modulating the source of photons into a pulsed source with a given spectral profile, the modulated source photons being used to pump an entangled photon source module that generates entangled photons at signal and idler wavebands via four-wave mixing in a nonlinear fiber, the signal and idler wavebands being subsequently filtered by a filter having substantially the same spectral profile as the pump photons, wherein the signal and idler photons pass through a periodic pass-band filter with a pass-band having a spectral response that is periodic in frequency and signals of both the desired signal and idler wavelengths pass through the same filter.

17. The apparatus of claim 16, where the spectral profile of the modulated pump photons having a bandwidth with more that 90% of the spectral power being contained in a bandwidth of 40 GHz to 0.4 GHz.

18. The apparatus of claim 16, wherein pump photons pass through the same periodic filter as signal and idler photons and wherein the pump wavelength photons are largely attenuated by filter.

19. The apparatus of claim 16, further comprising separating units; and wherein multiple signal and idle-bands are filtered by the periodic filter into substantially similar bandwidths and are subsequently separated by the separating units with larger bandwidths so that multiple signal and idler pairs can be generated simultaneously from the same source and then separated.

20. Method for producing entangled photon pairs, said method comprising: generating a plurality of photons in a source photons; coupling the source photons into a polarization maintaining optical circulator followed by a polarization switch and then a differential polarization group delay element; switching the polarization switch between a first and second position; in the first position the source photons being split evenly into photons with both polarization axes of the delay element and in the second position the source photons having one polarization axis of the delay element; coupling the output of the delay element into a nonlinear fiber producing signal and idler photons through a four-wave mixing interaction, reflecting an output signal from the nonlinear fiber by a non-reciprocal reflector causing the photons being' retro-reflected back through the nonlinear fiber and the delay element, collecting the reflected photons by the polarization maintaining circulator to produce output photons, wherein said output photons being in an entangled state if the polarization switch is in the first position and a quantum correlated state if the polarization switch is in the second position.

* * * * *